(12) United States Patent
Iyengar et al.

(10) Patent No.: US 10,944,588 B2
(45) Date of Patent: Mar. 9, 2021

(54) RESOLVING CONFLICTING COMMANDS RECEIVED BY AN ELECTRONIC DEVICE

(71) Applicant: International Business Machines Corporation, Armonk, NY (US)

(72) Inventors: Ashok K. Iyengar, Encinitas, CA (US); Trudy L. Hewitt, Cary, NC (US); Shili Yang, Markham (CA); Hendrik van Run, Utrecht (NL)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 16/203,762

(22) Filed: Nov. 29, 2018

(65) Prior Publication Data

US 2020/0177410 A1 Jun. 4, 2020

(51) Int. Cl.
*G10L 15/22* (2006.01)
*H04L 12/28* (2006.01)
*H04L 29/08* (2006.01)
*G10L 15/07* (2013.01)

(52) U.S. Cl.
CPC .......... *H04L 12/2821* (2013.01); *G10L 15/07* (2013.01); *G10L 15/22* (2013.01); *H04L 12/282* (2013.01); *H04L 67/306* (2013.01); *G10L 2015/223* (2013.01); *G10L 2015/227* (2013.01)

(58) Field of Classification Search
CPC ........ G10L 15/00–15/34; H04L 12/282; H04L 12/2821; H04L 67/306
See application file for complete search history.

(56) References Cited

U.S. PATENT DOCUMENTS

| 9,870,360 | B1 | 1/2018 | Bilinski et al. |
| 10,008,183 | B2 | 6/2018 | Ueda et al. |
| 2003/0185358 | A1* | 10/2003 | Sakamoto ............... G10L 15/26 379/102.01 |
| 2013/0172022 | A1 | 7/2013 | Seymour et al. |
| 2015/0181151 | A1 | 6/2015 | Nguyen et al. |
| 2016/0315996 | A1 | 10/2016 | Ha et al. |
| 2017/0076696 | A1 | 3/2017 | Ueda et al. |
| 2017/0103755 | A1 | 4/2017 | Jeon et al. |
| 2017/0200112 | A1 | 7/2017 | Liu et al. |
| 2017/0293851 | A1 | 10/2017 | Chawla et al. |
| 2018/0096690 | A1 | 4/2018 | Mixter et al. |
| 2018/0108368 | A1* | 4/2018 | Gong ...................... G10L 15/22 |

(Continued)

OTHER PUBLICATIONS

Amazon, "Alexa Help Videos," https://www.amazon.com/gp/help/customer/display.html?nodeId=202016320&video_id=fb6b9752, printed Nov. 28, 2018, 2 pgs.

(Continued)

*Primary Examiner* — Abul K Azad
(74) *Attorney, Agent, or Firm* — Jamar K. Ray (57) ABSTRACT

A method for controlling a device may include obtaining a conflict-resolution setting from a plurality of available conflict settings. The conflict resolution settings may establish one or more rules for resolving conflicting commands received by the device from a first user and a second user. The method may further include determining, based at least in part on the conflict-resolution setting, a response to a second command issued by the second user that conflicts with a first command issued by the first user. The method may further include performing the response.

20 Claims, 8 Drawing Sheets

(56) References Cited

U.S. PATENT DOCUMENTS

2018/0122378 A1    5/2018    Mixter et al.

OTHER PUBLICATIONS

Welch, C., "Amazon's Alexa can now recognize different voices and give personalized responses," The Verge, https://www.theverge.com/circuitbreaker/2017/10/11/16460120/amazon-echo-multi-user-voice-new-feature, Oct. 11, 2017, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

Command List

| User | Command | Time | Status | User Playlists | CR Setting |
|---|---|---|---|---|---|
| User 1 | "Play Playlist 1" | 13:00 | HH | Playlist 1 | Compromise |
| User 2 | "Play Playlist 2" | 13:10 | P003 | Playlist 2 | Compromise |

435

Profile Playlists

| User 1 | | | User 2 | | |
|---|---|---|---|---|---|
| Playlist 1 | | | Playlist 2 | | |
| Name | Artist | Genre | Name | Artist | Genre |
| Track 1 | A1 | R&B | Track 6 | A6 | Latin |
| Track 2 | A2 | Top 40 | Track 7 | A7 | Classic Rock |
| Track 3 | A3 | Electronic | Track 8 | A8 | Rap |
| Track 4 | A4 | Jazz | Track 9 | A9 | Alternative |
| Track 5 | A5 | Classical | Track 10 | A10 | Top 40 |

RESOLVING CONFLICTING COMMANDS RECEIVED BY AN ELECTRONIC DEVICE

BACKGROUND

The present disclosure relates to electronic devices, and more specifically, to voice-controlled electronic devices.

Electronic devices may be controlled by a variety of user interfaces. Voice-controlled devices ("VCD's") include an interface that permits users to control the device via verbal commands to the device.

SUMMARY

Some embodiments of the present disclosure can be illustrated as a method for controlling a device. The method may include obtaining a conflict-resolution setting selected from a plurality of available conflict-resolution settings. The conflict-resolution setting may establish one or more rules for resolving conflicting commands received by the device. The method may further include receiving a first command from a first user. The method may further include receiving a second command from a second user. The second command may conflict with the first command. The method may further include determining, based at least in part on the conflict-resolution setting, a response to the second command. The method may further include performing the response via the device.

Some embodiments of the present disclosure can be illustrated as a system comprising a processor and a memory in communication with the processor, the memory containing program instructions that, when executed by the processor, are configured to cause the processor to perform the aforementioned method.

Some embodiments of the present disclosure can be illustrated as a computer program product, the computer program product comprising a computer readable storage medium having program instructions embodied therewith, the program instructions executable by a computer to cause the computer to perform the aforementioned method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to user control of electronic devices; more particular aspects relate to resolving conflicts between user commands made to electronic devices. While the present disclosure is not necessarily limited to such applications, various aspects of the disclosure may be appreciated through a discussion of various examples using this context.

Voice-command devices ("VCD's") are devices that can be controlled by a human voice. A VCD may be a device, such as a telephone, television, or thermostat, that can perform a response to a command. A VCD may also be a device, such as an electronic personal assistant, that may communicate a command to an external electronic device to perform the command. For example, an electronic personal assistant may receive a voice command to adjust a room temperature setting and communicate the command to a thermostat that performs the temperature setting adjustment.

Since VCD's may be controlled by voice commands of multiple users, a problem inherent to voice-command technology is managing conflicting voice commands issued by different users. For example, if a first user commands a VCD to play classical music, and afterward, a second user commands the VCD to play rock music, a problem may arise if the VCD merely responds to the last command given.

To address this and other problems, embodiments of the present disclosure include logic that can determine how to resolve conflicting commands issued to a VCD by different users. In some embodiments, a device (e.g., a VCD such as a personal assistant) may obtain a conflict-resolution setting. The conflict-resolution setting may be selected (e.g., by a user, or by the device automatically using artificial intelligence and/or historical information) from a plurality of conflict-resolution settings. The conflict-resolution setting may establish one or more rules for resolving conflicting commands received by the device.

The device may receive a first command from a first user. After receiving the first command, the device may receive a second, conflicting command from a second user. One or more of the first and second commands may be verbal commands received by a microphone communicatively coupled to the VCD. The device may analyze the received commands (e.g., using natural language processing and/or audio processing techniques) and determine that the commands conflict (e.g., the device is unable to execute both commands simultaneously). The device may determine a response to the second command based on the selected conflict-resolution setting. For example, the response may be based on the order in which the commands were received, the identities of the first and second users, or the content of the first and second commands. The device may then perform the second command or perform an alternate response.

For example, some embodiments of the present disclosure may provide conflict-resolution settings, such as a first-come-first-served setting, a head-of-household setting, a combined-command setting, and a compromise-action setting. Furthermore, the conflict-resolution settings may determine a response based at least in part on user profiles that contain user data, such as a user name, preferences, interests, music playlists, previously issued voice commands, voice-identification data, user images, and/or other characteristics of a user. Embodiments of the present disclosure may also include a set of override settings that may permit an override response to be performed instead of a determined response. Additionally, embodiments of the present disclosure may integrate artificial intelligence and machine learning to determine a response to conflicting commands issued by different users.

First, in some embodiments of the present disclosure, a user may select a first-come-first-served conflict-resolution setting. Under the first-come-first-served setting, the VCD prioritizes the command that it received first when it receives two conflicting commands issued by different users. Regarding the command received second by the VCD, a user setting or artificial intelligence may be used to determine whether to perform the second command after the first command has been performed or to ignore the second command altogether.

For example, an embodiment of the present disclosure may include a voice-controlled speaker capable of playing audio recordings in response to voice commands. Under a first-come-first-served setting, if a first user issued a first command for the speaker to play a song by Artist A, and a second user subsequently issued a second command for the speaker to play a song by Artist B, the speaker would prioritize the first command and play the song by Artist A. Furthermore, a user may have specified when selecting the first-come-first-served setting that subsequent conflicting commands by a different user would be performed in sequence; thus, the speaker would play the song by Artist B after the song by Artist A had been played.

In another example of an embodiment of the present disclosure, artificial intelligence of the VCD may be used to determine how the VCD responds to a subsequent conflicting command by a different user. In this example, a voice-controlled speaker is operating under a first-come-first-served setting, and a first user issues a first command for the speaker to play an audiobook. Shortly thereafter, a second user issues a second command for the speaker to play a song by Artist A. In this embodiment, the speaker would prioritize the first command and play the audiobook. Regarding the second command, the speaker could implement artificial intelligence to compare factors, such as the type and duration of the audio requested in the first and second commands, and then make a determination to ignore the second command altogether.

Next, in some embodiments of the present disclosure, a user may select a head-of-household conflict-resolution setting. Under the head-of-household setting, the VCD may prioritize commands based on a defined seniority between users. In some embodiments, the defined seniority may be based on a designation, such as "head-of-household," included in a user profile. The head-of-household designation may indicate that the VCD will prioritize commands given by a user who has the designation over the commands of all other users. In some embodiments, the defined seniority may be a selected seniority between user profiles. For example, during a setup of the VCD, a user may designate that User C will be senior to User A and that User B will be senior to User C. Accordingly, in this example, when the VCD receives conflicting commands between Users A, B, and C, the VCD will prioritize the commands of User B over the commands of Users A and C, and it will prioritize the commands of User C over the commands of User A.

Additionally, in some embodiments, artificial intelligence of the VCD may be used to define a seniority of the users. For example, in some embodiments, the VCD may analyze users' voices and determine that a user with a perceived adult voice will be given a profile senior to that of a user with a perceived child voice. Thus, commands issued by users perceived to be adults may be prioritized over commands issued by users perceived to be children.

In another example, the VCD may determine that a previously created user profile will be designated as senior to a subsequently created user profile. Thus, commands issued by a user with a stored profile may be prioritized over commands issued by a newer user.

Next, in some embodiments of the present disclosure, a user may select a combined-command conflict-resolution setting. Under the combined-command setting, the VCD may perform a combination of two received conflicting commands issued by different users. Furthermore, a determination of how the conflicting commands are combined and performed may be based on input user settings, Internet of Things ("IoT") devices, artificial intelligence, machine learning, or a combination thereof.

In a first example, in some embodiments of the present disclosure, the VCD may be a television operating under a combined-command setting. A first user may issue a first command for the television to display a football game, and a second user may issue a second command for the television to display an awards show. Under the combined-command setting, the television may perform the combined response of alternating between displaying the football game for a predetermined time period and displaying the awards show for a predetermined time period, as previously established by a user input setting. Alternatively, the television may utilize artificial intelligence to determine how to alternate between displaying the football game and displaying the awards show. For example, using artificial intelligence, the television may analyze characteristics of each program, such as dialogue, background audio content, and images and then alternate between the programs based on a perceived importance of a program segment or based on when one program transitioned to a commercial.

In a second example, in some embodiments of the present disclosure, the VCD may be a speaker capable of playing audio recordings in response to voice commands. A first user may issue a first command for the speaker to play a first playlist, and a second user may issue a second command for the speaker to play an album by Artist A. Under the combined-command setting, the speaker may perform the combined response of alternating between playing a song from the playlist and playing a song from the album by Artist A. Alternatively, the speaker may define a combined playlist containing the first playlist and the album by Artist A. Then the speaker may play songs at random from the combined playlist or it may use artificial intelligence and machine learning to play songs in an order based on characteristics like key, tempo, and genre.

Last, in some embodiments of the present disclosure, a user may select a compromise-action conflict-resolution setting. Under the compromise-action setting, the VCD may perform a compromise-action determined likely to resolve conflicting voice commands issued by different users. Such a compromise-action may be predetermined in user-selected settings or it may be determined by artificial intelligence and machine learning of the VCD. Furthermore, the compromise-action may be related to both of the conflicting voice commands, related to one of the conflicting voice commands, or it may be unrelated to either of the conflicting voice commands issued by different users.

For example, in some embodiments of the present disclosure, the VCD may be a speaker capable of playing audio recordings in response to voice commands and further equipped to utilize artificial intelligence and machine learning technologies. In this embodiment, a first user may issue a first command for the VCD to play song A. Shortly thereafter, a second user may issue a second command for the VCD to play song B. Shortly thereafter again, the first user may reissue the first command for the VCD to play song A. In response, the VCD, operating under a compromise-action conflict-resolution setting, may analyze contextual information about the commands, such as the number of times conflicting commands were issued within a period of time, whether stored profiles of the first and second users indicated that both users were below a threshold age, and the volume of speech used by each user when issuing each command. Utilizing artificial intelligence and machine learning technology, the VCD may determine from the context of the conflicting commands that the first and second users are children issuing conflicting commands during an argument. Furthermore, the VCD may perform a compromise-action, such as stopping playback of all audio recordings and temporarily ignoring all commands until a command is issued by a user having an adult profile.

In another example, in some embodiments of the present disclosure, the VCD may be a thermostat capable of adjusting a room temperature in response to voice commands. In such an embodiment, a first user may issue a first command for the VCD to adjust the room temperature to 65 degrees Fahrenheit, and a second user may issue a second command for the VCD to adjust the room temperature to 75 degrees Fahrenheit. In response, the VCD, operating under a compromise-action conflict-resolution setting, may adjust the room temperature to 70 degrees Fahrenheit, in accordance with a prior user setting for the VCD to adjust the room temperature to the average temperature value of two conflicting temperature adjustment commands.

In addition to including a set of conflict-resolution settings, embodiments of the present disclosure may also include additional user options, such as an option to choose a hierarchy for the conflict-resolution settings and an override option.

Embodiments that include an option for a user to choose a hierarchy for the conflict-resolution settings may allow the VCD to transition between the conflict-resolution settings in various circumstances. For example, in some embodiments a user may select the head-of-household setting and choose the compromise-action setting as a second-in-hierarchy setting. In this example, if a first user and a second user issue conflicting commands and neither user has a head of household profile, the VCD may transition to the second-in-hierarchy setting (the compromise-action setting in this example) and determine a response in accordance with the second-in-hierarchy setting.

Embodiments that include an override option may permit modifications to a conflict-resolution response in view of circumstances in which a modified response may better resolve the conflicting commands. The modification may be user-defined, or it may be determined by the VCD. For example, in some embodiments, the VCD may include a television operating under a first-come-first-served setting with an override option. The television may also be connected to a first user wearable device over one or more networks. In this example, if the first user issued a first command for the television to play movie A and then left the vicinity of the television, a second user's conflicting second command to play movie B may be performed by the television despite the first-come-first-served response. Such a modification may be based on an override option allowing performance of a conflicting second command when a VCD detects, based on a first user wearable device, that the first user has left the vicinity of the VCD. Such a modification may be predefined by a user or it may be determined by artificial intelligence of the VCD.

Some embodiments of the present disclosure allow user profiles to be created by the user or by the VCD. In some embodiments, a user may create or modify a user profile during a VCD setup process. During such a process, a user may input to the VCD user information, such as a user name, preferences, interests, music playlists, previously issued voice commands, voice-identification data, user images, and/or other characteristics of a user. Such user information may be stored and referenced by the VCD.

Regarding a user not having a stored profile, or an "unknown user," who issues a command to a VCD, some embodiments may allow a user to preestablish a VCD response to such an unknown user. For example, some embodiments may allow a user setting up a VCD to establish that commands issued by an unknown user will be ignored or given a lowest seniority. However, in some embodiments, a user may permit a VCD to rely on artificial intelligence to create an unknown user profile for each unknown user who issues a command to the device. For example, a user may allow the VCD to access, via one or more networks, images and timestamps from a household camera to detect a regular household visitor, such as a babysitter. The VCD may then create a profile having a default seniority for the regular household visitor.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
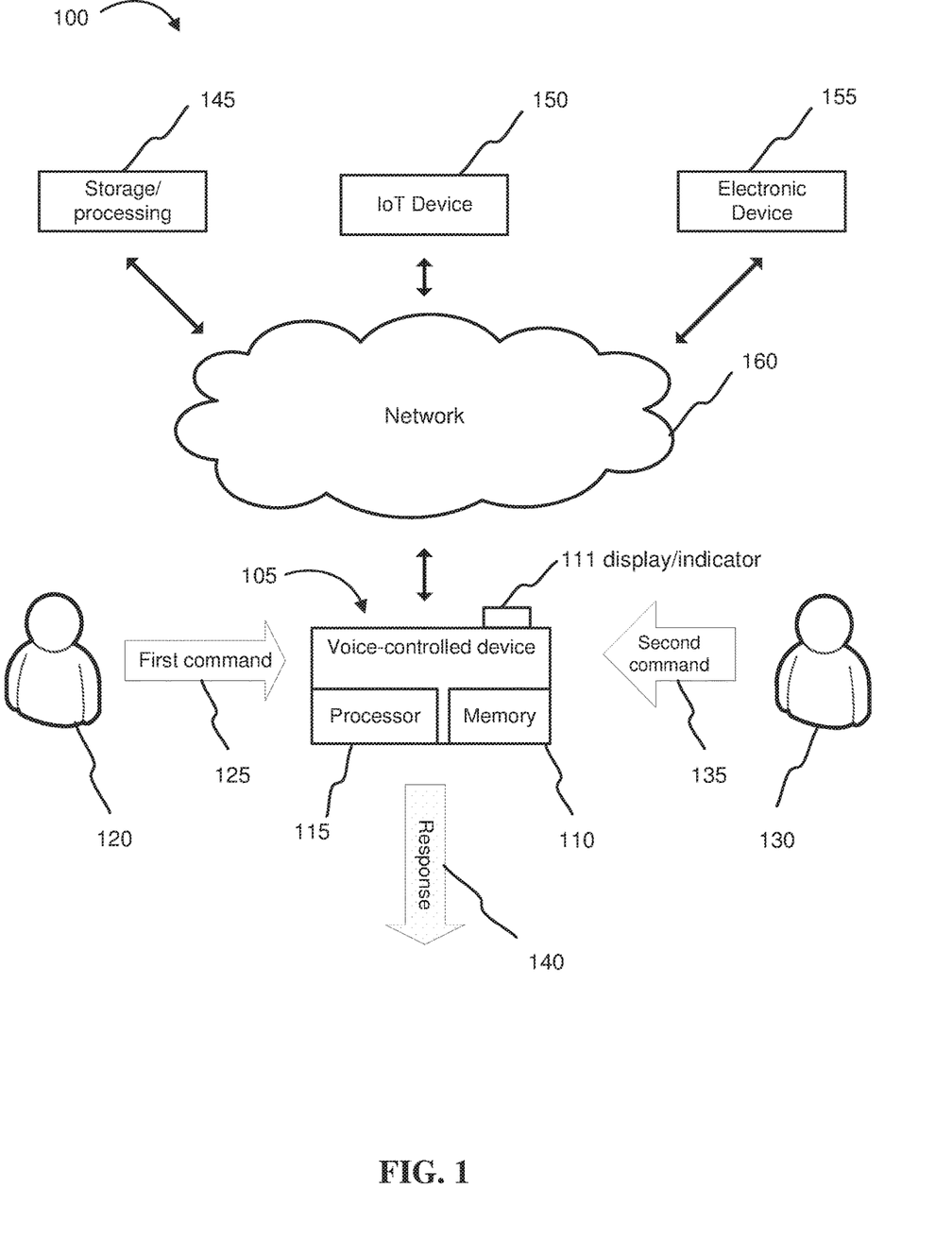
FIG. 1 depicts an example computing environment having a voice-controlled device, in accordance with embodiments of the present disclosure.

Turning to the figures, FIG. 1 illustrates an example embodiment of a VCD system 100 according to the present disclosure. In the illustrated embodiment, the VCD system 100 includes a VCD 105 that has a memory 110 and a processor 115. Memory 110 may store data, such as user settings, user usage history, user commands, and user profile data. Processor 115 may perform functions, such as analyzing input data and generating VCD responses. In some embodiments, the processor 115 may execute computer-readable instructions to perform one or more of the methods described herein. Additionally, in some embodiments, the VCD may include one or more audio indicators or visual displays 111 that may provide information, such as an indication of how a command is being treated, which conflict-resolution setting the VCD is applying, or which users have been identified. For example, an audio indicator may beep twice when a command is ignored, an LED may emit a certain color light when a command is performed or queued, and/or a screen may display "Compromise" when a compromise-action setting has been selected.

The VCD 105 may communicate with an array of devices, such as one or more external storage and/or processing devices 145, such as one or more servers. The VCD may also communicate with one or more IoT devices 150, such as wearable technology devices or cameras. The VCD 105 may further communicate with one or more additional electronic devices 155, such as televisions, telephones, or thermostats. The VCD may communicate via a direct physical connection or via one or more networks 160.

In some embodiments, the network 160 can be implemented using any number of any suitable communications media. For example, the network 160 may be a wide area network (WAN), a local area network (LAN), an internet, or an intranet. In certain embodiments, one or more of the storage/processing device(s) 145, IoT device(s) 150, the electronic device(s) 155, and/or the VCD 105 may be local to each other, and they may communicate via any appropriate local communication medium. For example, the electronic devices 155 and the VCD 105 may communicate using a local area network (LAN), one or more hardwire connections, a wireless link or router, or an intranet. In some embodiments, storage/processing device(s) 145, IoT device(s) 150, the electronic device(s) 155, and/or the VCD 105 may be communicatively coupled using a combination of one or more networks and/or one or more local connections. For example, the electronic device(s) 155 may be hardwired to the VCD 105 (e.g., connected with an Ethernet cable) while the IoT devices 150 may communicate with the VCD using the network 160 (e.g., over the Internet).

In some embodiments, the network 160 can be implemented within a cloud computing environment or using one or more cloud computing services. In some embodiments, the network 160 may be substantially similar to, or the same as, network 50 described in FIG. 6 and FIG. 7. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 160.

In operation, the VCD 105 may receive a first command 125 from a first user 120 and then receive a second conflicting command 135 from a second user 130. The VCD may then communicate with one or more storage/processing devices 145, IoT devices 150, and or additional electronic devices 155, to determine and perform a response 140 to the second conflicting command 135.

For example, the processor 115 may utilize information received from the storage devices 145 (e.g., profile information for the first and second users 120, 130) and from the IoT device 150 (e.g., wearable devices of the first and second users 120, 130) to determine that the first user 120 is no longer within a specified vicinity of an electronic device 155 (e.g., a smart TV). Based on this information, if the first and second commands 125, 135 requested that a smart TV display two different programs, the processor 115 may determine that the second command 135 should be executed based on the first user 120 no longer being near the smart TV. Accordingly, the processor 115 may issue a response 140 (e.g., an electronic command or instruction) that causes the electronic device 155 to display the program requested in the second command 135.

Figure 2:
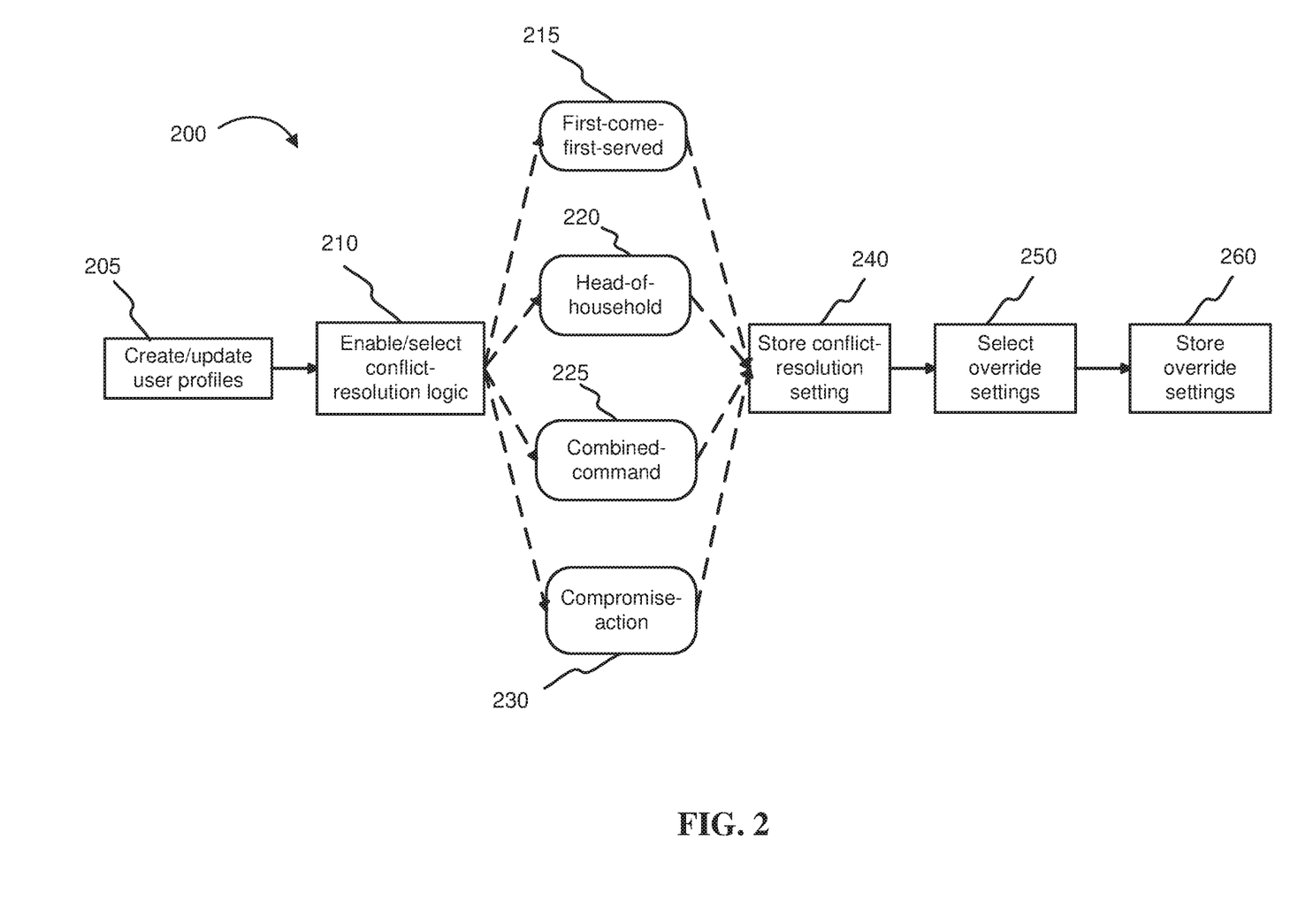
FIG. 2 depicts a flowchart of an example method for setting up a voice-controlled device, in accordance with embodiments of the present disclosure.

FIG. 2 illustrates an embodiment of an example method 200 for setting up a VCD according to the present disclosure. Method 200 may be implemented during an initial set up of the VCD or to modify a previously operated VCD. One or more operations of method 200 may be performed by a processor (e.g., processor 115 of FIG. 1) automatically or in response to user input. Method 200 begins with a step to create or update user profiles 205. In step 205, a user may input or modify information, such as user identification data and user preferences. Next, in step 210, a user may enable the VCD's conflict-resolution logic to resolve conflicting commands issued to the VCD by different users. The user may then select from a first-come-first-served setting 215, a head-of-household setting 220, a combined-command setting 225, and/or a compromise-action setting 230. Each setting may determine a response of the VCD to conflicting commands issued to the VCD by different users. Additionally at step 210, a user may choose a hierarchy for the conflict-resolution settings, such that the VCD may transition between the conflict-resolution settings in a preferred order if necessary to resolve conflicting commands. Next, at step 240, the conflict-resolution setting may be stored. At step 250, a user may include an override setting, such that a response to the conflicting commands that was determined by the VCD may be modified to better resolve the conflict. Finally, at step 260, the override settings may be stored.

Figure 3A:
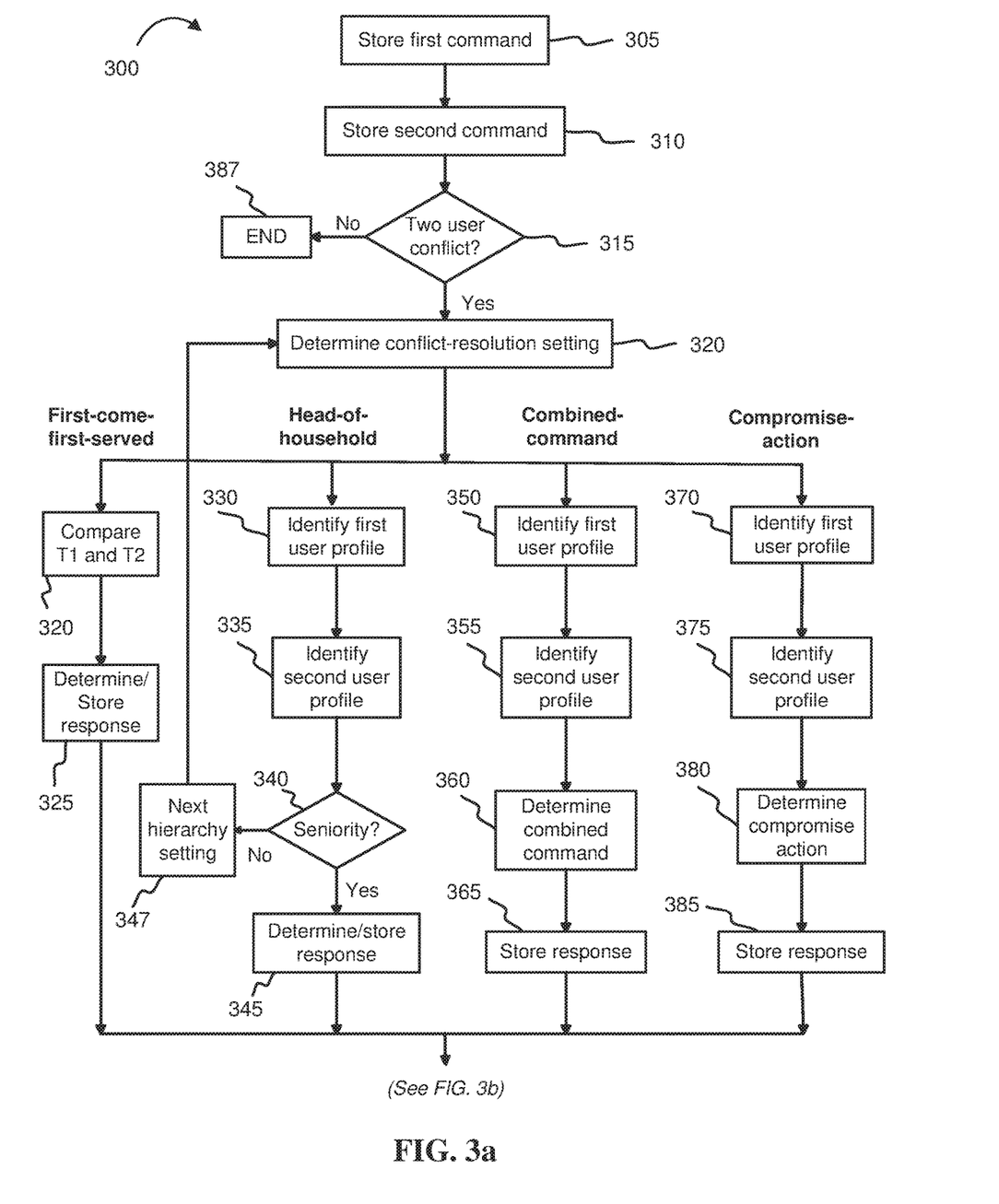
FIGS. 3a and 3b depict a flowchart of an example method of operation of a voice-controlled device, in accordance with embodiments of the present disclosure.
Figure 3B:
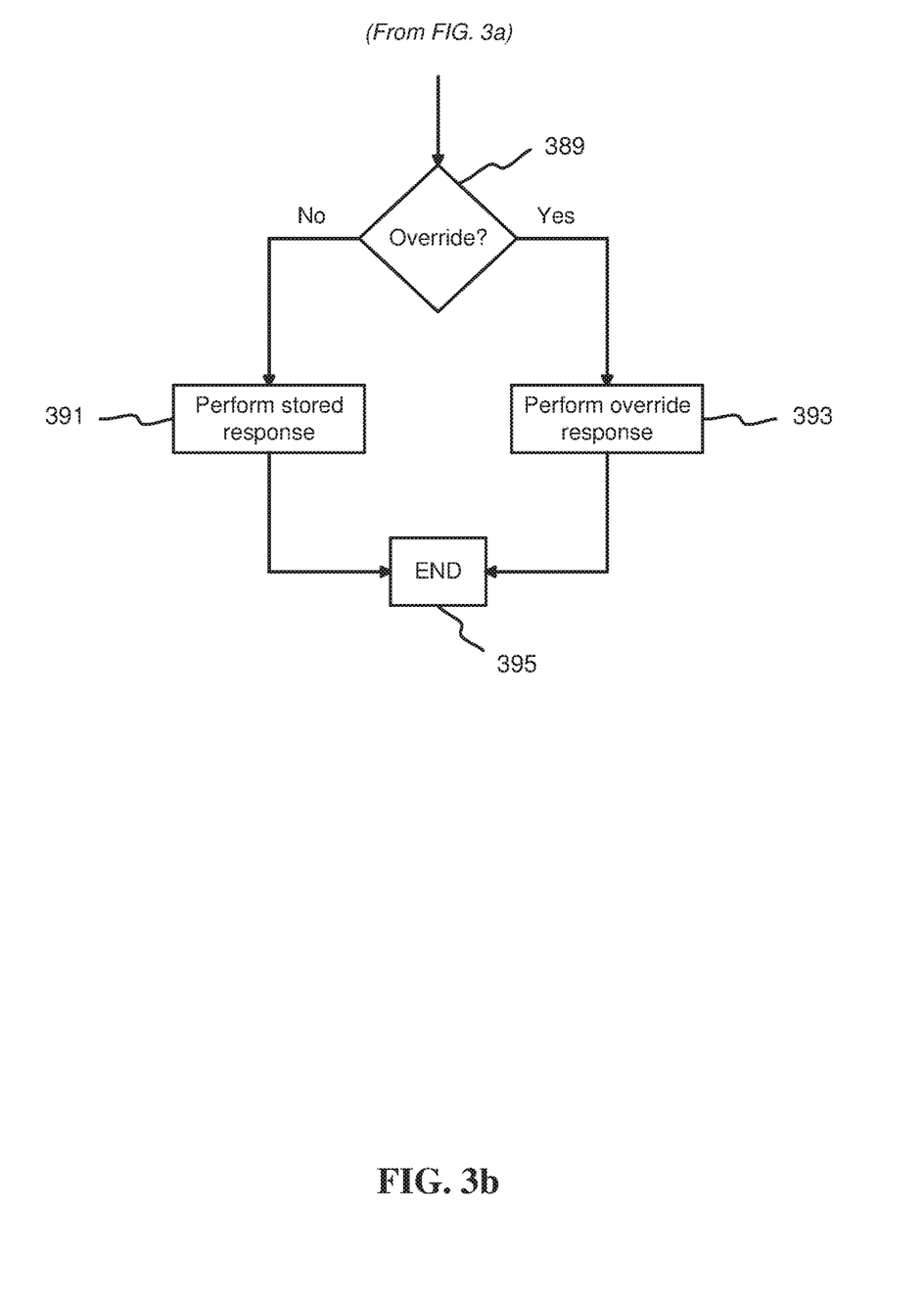

FIGS. 3a and 3b illustrate an embodiment of an example method 300 for operating a VCD according to the present disclosure. One or more operations of method 300 may be performed by a processor (e.g., processor 115 of FIG. 1) automatically or in response to user input. FIG. 3a illustrates initial steps of method 300. At step 305, a first command issued by a user to the VCD is received and stored by the VCD or a storage device external to the VCD. The first command may be an auditory command that the VCD receives using one or more microphones communicatively coupled to the VCD. Additionally at step 305, contextual data regarding the command is stored. Such contextual data may include information, such as the time (T1) the command was issued, the volume of speech with which the user issued the command, and the number of times the command has been issued within a predetermined time period. Similarly, at step 310, a second command issued by a user to the VCD is received and stored, and contextual data regarding the second command may be stored as well.

At step 315, the VCD may determine, based on a voice analysis, whether the first and second commands were issued by two different users. Furthermore, at step 315, the VCD may compare the first and second commands and determine whether a conflict exists between them. A conflict may exist if the first and second commands cannot be performed simultaneously. For example, a conflict may exist between a first command to play music album A and a second command to play music album B. In contrast, a conflict may not exist between a first command to turn on an air conditioner and a second command to set the room temperature to 70 degrees Fahrenheit. If the VCD determines that the first and second commands were issued by two different users and that the commands conflict with one another, then the VCD may determine a conflict-resolution setting at step 320 to resolve the conflict. Otherwise, if the VCD determines that the commands are issued by the same user or that the commands do not conflict with one another, then the VCD, at step 387, does not proceed to determining a conflict-resolution setting 320.

Next, at step 320 the VCD may determine a conflict-resolution setting based on at least one prior selection by a user. For example, if a user selected a combined-command conflict-resolution setting during an initial setup of the VCD, then the VCD would apply the combined-command method steps (steps 350-365) to determine a response to the second conflicting command. In some embodiments, the user may choose a preferred hierarchy for the conflict-resolution settings. In these embodiments, the VCD may determine which conflict-resolution setting to apply in an order of descending hierarchy and based on whether the setting may resolve the conflict.

If a first-come-first-served conflict-resolution setting is selected, the VCD may compare, at step 320, a stored time (T1) when the first command was issued and a stored time (T2) when the second command was issued. At step 325, the VCD may determine, based on the comparing, which command was received first, generate a response based on the first-received command, and the VCD may store the response to be performed.

If a head-of-household conflict-resolution setting is selected, the VCD may identify a first user profile at step 330 and a second user profile at step 335. Steps 330 and 335 may include obtaining seniority information from a known user profile or from an unknown user profile. For example, a first user may have a stored profile that includes a "head-of-household" (first, highest seniority) status, and a second user may be an unknown user whose default profile is assigned a "tenth seniority" status, based on user settings established during an initial setup of the VCD. Furthermore, the first and second user profiles may be identified by comparing voice signatures from the first and second commands to auditory fingerprints stored in a memory accessible to (e.g., attached to or queryable by) the VCD. Based on the comparison, the VCD may determine an identity of the first and second users. Then at step 340, the VCD may compare the seniority status of the first user to the seniority status of the second user and determine that the response to be performed will conform with the command issued by the user with the highest seniority status. At step 345, the VCD may store that response.

If neither the first user nor the second user has a profile with a seniority status, or if both users have an identical seniority status, the VCD may proceed to step 347 and determine an alternate conflict-resolution setting to apply. The alternate conflict-resolution setting may be based on a hierarchy selected by a user during an initial setup of the VCD.

If a combined-command conflict-resolution setting is selected, the VCD may identify a first user profile at step 350 and a second user profile at step 355. Steps 350 and 355 may include obtaining user data, such as user playlists or other preferences. At step 360, the VCD may determine a combined-command response to conflicting commands issued by two different users. The combined-command response may attempt to resolve the conflict by issuing a response that incorporates aspects from each of the first and second commands. For example, at step 360, the VCD may determine a response of changing a room temperature to 82 degrees after receiving a first command from a first user to change the room temperature to 80 degrees and then receiving a second command from a second user to change the room temperature to 84 degrees. At step 365, the VCD may store the generated response.

If a compromise-action conflict-resolution setting is selected, the VCD may identify a first user profile at step 370 and a second user profile at step 375. Steps 370 and 375 may include obtaining user data, such as playlists, favorite artists, favorite television shows, preferred genres, and preferred room temperature settings. At step 380, the VCD may determine a compromise-action response to conflicting commands issued by two different users. A compromise-action response may include a response that the VCD predicts would be acceptable to each of the first and second users based on the first and second commands and the first and second user profiles. A detailed example of determining such a compromise-action response is included with the discussion of FIG. 4 below. At step 385, the VCD may store the response.

FIG. 3b illustrates the remaining steps of the method 300. After a response has been stored, the VCD, at step 389, may determine whether an override setting has been established by a user. Furthermore, at step 389, the VCD may utilize artificial intelligence to analyze contextual data regarding the commands and determine whether an override response may better resolve the conflicting commands. An override response may modify or replace a determined conflict-resolution response (e.g. a response determined in step 325, 345, 360, or 380) when a user or the VCD predicts, based on user data and/or the circumstances surrounding the commands, that an alternate response may better resolve the conflicting commands. In step 393, the override response may be performed if an override response has been established by a user or by the VCD. If no override response has been established, then the stored response may be performed at step 391. Afterward, the conflict-resolution logic may end at step 395.

Figure 4:
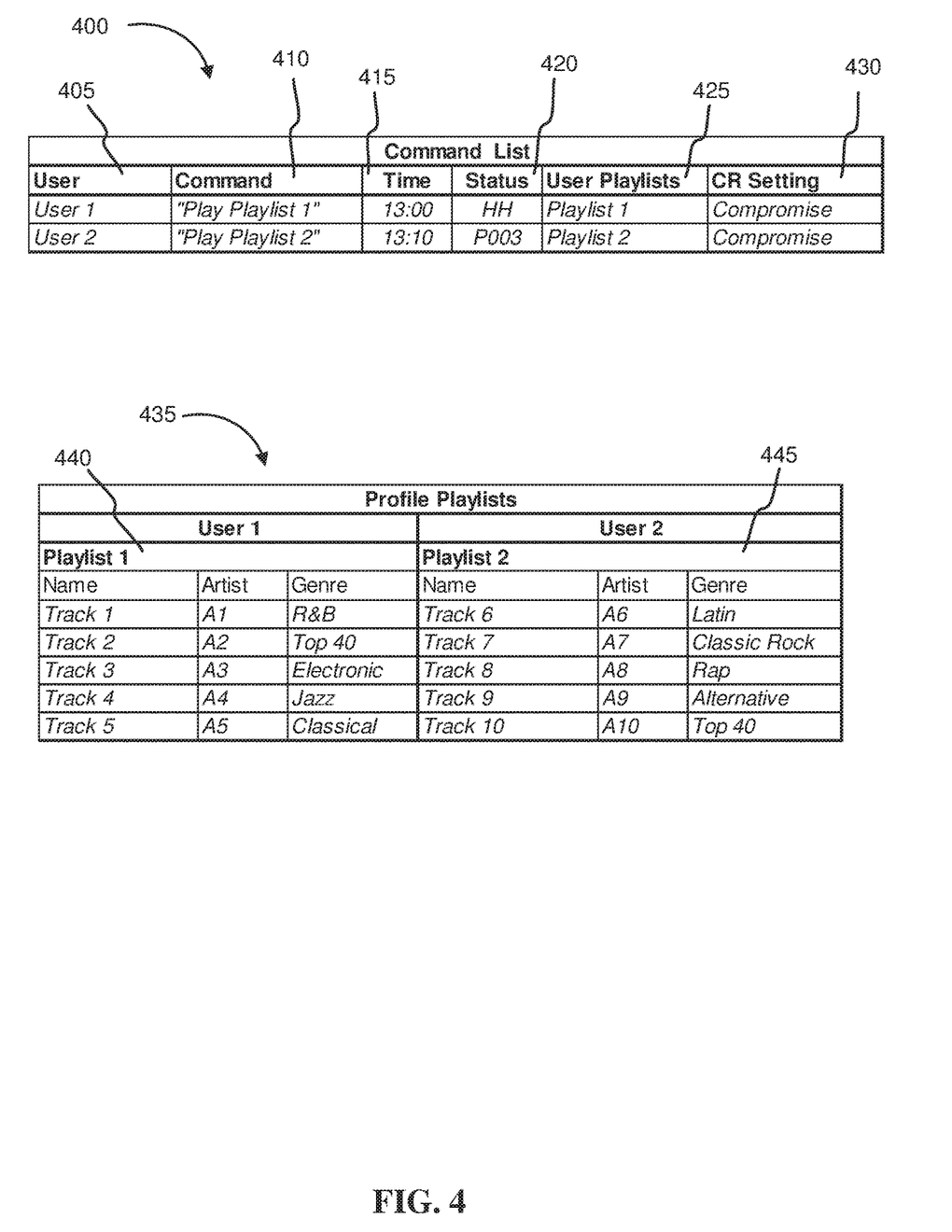
FIG. 4 depicts exemplary tables of a data file supporting a voice-controlled device, in accordance with embodiments of the present disclosure.

FIG. 4 illustrates tables of a data file that may be created in embodiments of the present disclosure. Tables 400 and 435 include data that may be stored for embodiments in which a VCD includes a speaker capable of playing audio recordings in response to voice commands. Furthermore, as indicated in column 430 of table 400, a user has enabled compromise-action conflict-resolution logic in the VCD.

Table 400 shows that two different user names have been stored in column 405. User 1 has issued a command to play Playlist 1, and User 2 has issued a command to play Playlist 2. The commands are stored in column 410. Furthermore, the time each command was issued is stored in column 415. Column 420 indicates that User 1 has a profile with a head-of-household seniority status, and User 2 has a profile with a third-in-priority status. Last, column 425 includes playlist names associated with each user's profile.

Next, table 435 shows detailed information about each user's playlist. Sub-table 440 includes a track name and a corresponding artist and genre for each track of User 1's Playlist 1. Sub-table 445 includes the same categories of information for each track of User 2's Playlist 2.

In determining a compromise-action response to the second conflicting command, "Play Playlist 2," the VCD may use artificial intelligence to analyze the users' playlists. For example, the VCD may search for matching track names within Playlist 1 and Playlist 2. After not finding any matching track names, the VCD may search for matching artist names within the playlists. After not finding any matching artist names, the VCD may search for matching genres within the playlists. After finding that each playlist includes a "Top 40" genre, the VCD may respond to the second conflicting command by playing a sequence of songs categorized in a "Top 40" genre. Alternatively, the VCD may respond by alternating between playing songs from Playlist 1 and Playlist 2, beginning by playing a song from Playlist 1, as User 1's profile has a head-of-household status. In another response, the VCD may play Track 2 followed by Track 10 because both songs are categorized in the "Top 40" genre. Then, unable to determine any further compromise action, the VCD may transition to another conflict-resolution setting, based on a hierarchy preselected by the user.

Additionally, in the examples above, the VCD may stop performing a response that is based on the command issued by User 1 if it detects, e.g., based on a camera or other IoT device, that User 1 has left the speaker's vicinity. Performing such an override response may further include only playing songs from Playlist 2, as requested by User 2. In an alternate override response example, the VCD may respond by playing a soundtrack from a musical, based on a user-defined override setting for the VCD to play the soundtrack when Users 1 and 2 are present at a particular time of day.

Figure 5:
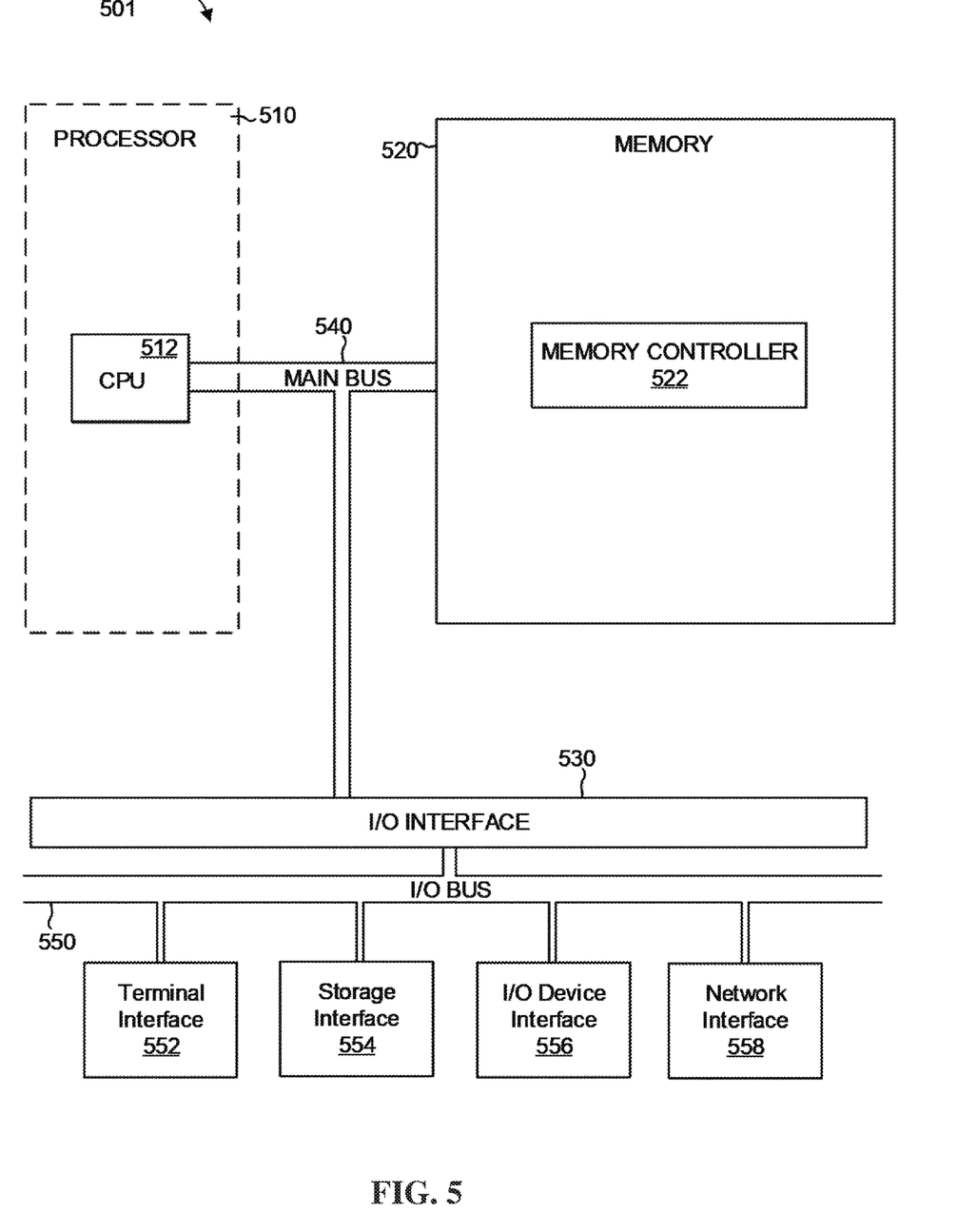
FIG. 5 depicts the representative major components of a computer system that may be used in accordance with embodiments of the present disclosure.

FIG. 5 depicts the representative major components of an exemplary Computer System 501 (e.g., a VCD) that may be used in accordance with embodiments of the present disclosure. The particular components depicted are presented for the purpose of example only and are not necessarily the only such variations. The Computer System 501 may comprise a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may be comprised of one or more CPUs 512. The Processor 510 may additionally be comprised of one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may be comprised of one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may be comprised of a Memory Controller 522 and one or more memory modules for temporarily or permanently storing data (not depicted). In some embodiments, the Memory 520 may comprise a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may comprise an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may comprise the Terminal Interface 552, the Storage Interface 554, the I/O Device Interface 556, and the Network Interface 558. In some embodiments, the various interfaces may comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
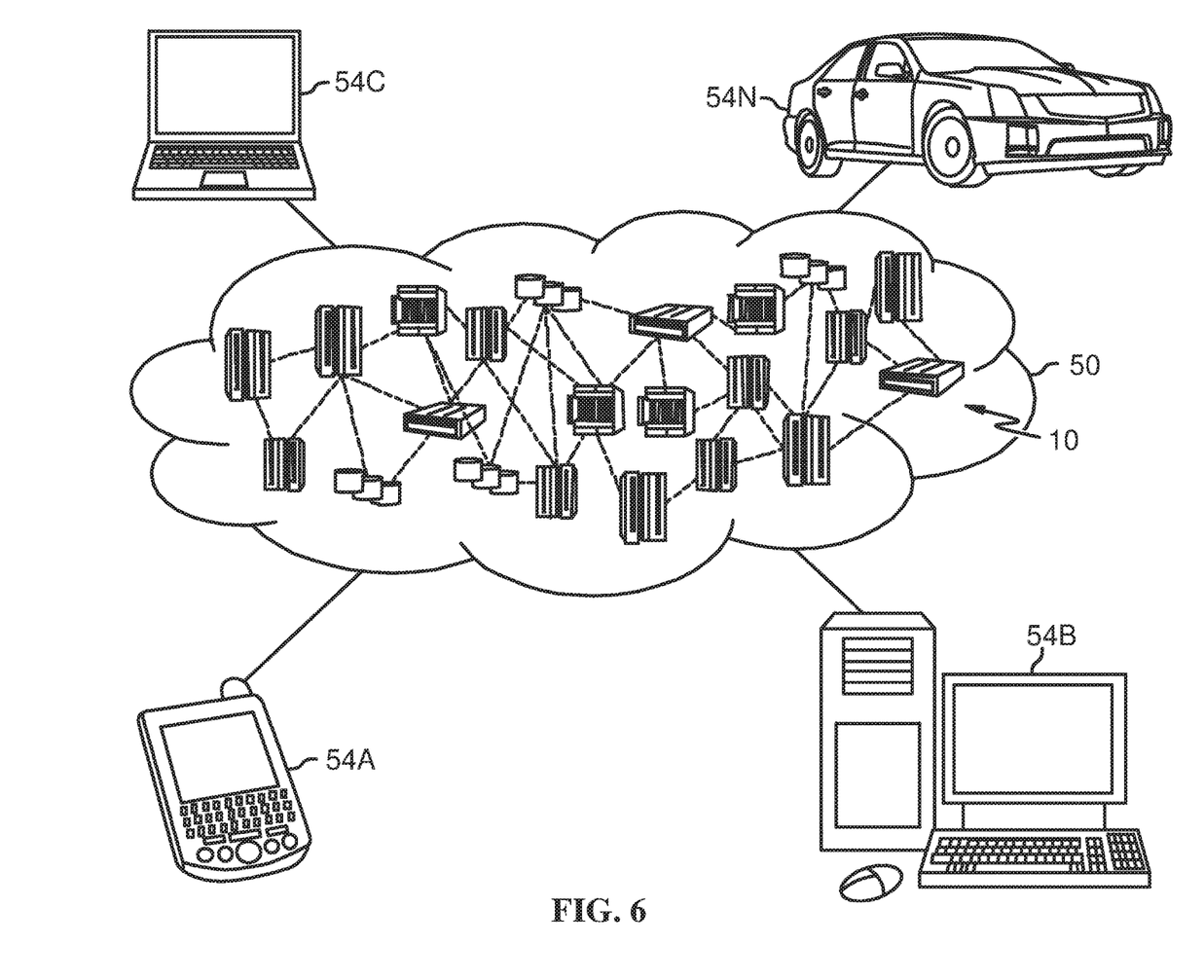
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
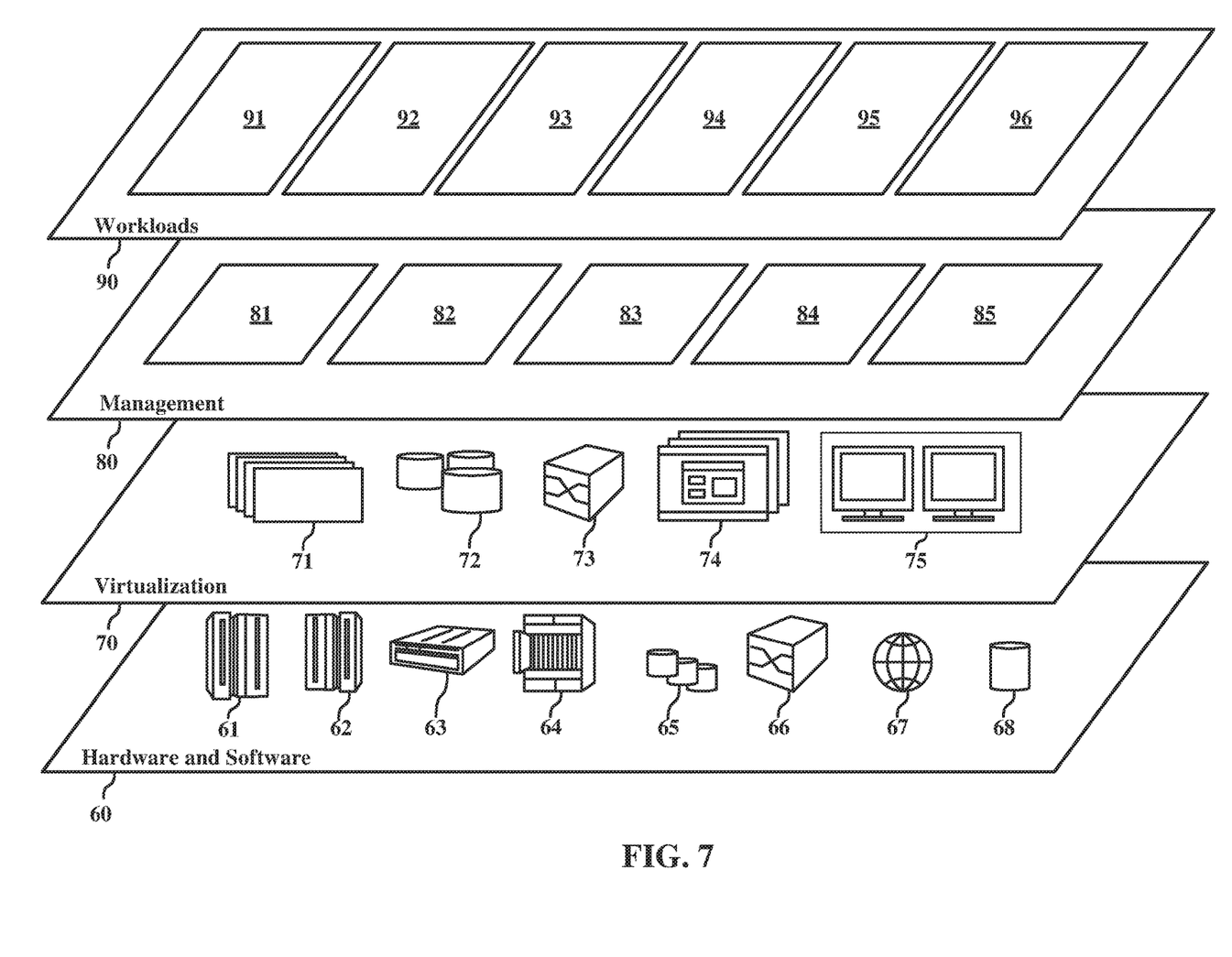
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and command conflict-resolution logic 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for controlling a device comprising:
   obtaining a conflict-resolution setting selected from a plurality of available conflict-resolution settings,
      wherein the conflict-resolution setting establishes one or more rules for resolving conflicting commands received by the device, and
      wherein the plurality of available conflict-resolution settings has a preselected transitioning hierarchy;
   receiving a first command from a first user;
   receiving a second command from a second user,
      wherein the second command conflicts with the first command;
   determining, based at least in part on the conflict-resolution setting, a response to the second command; and
   performing the response via the device.

2. The method of claim 1, further comprising:
   obtaining first-user data of the first user; and
   obtaining second-user data of the second user,
   wherein the determining is based at least in part on the first-user data and the second-user data.

3. The method of claim 2, wherein the determining further comprises comparing a seniority status of the first user to a seniority status of the second user, and
   wherein the response includes performing the first command in response to determining that the first user has a higher seniority than the second user.

4. The method of claim 2, wherein the determining further comprises combining the first command and the second command; and
   wherein the performing the response comprises performing a combination of the first command and the second command.

5. The method of claim 2, wherein the determining further comprises predicting the response based on the first-user data and the second-user data,
   wherein the response is different from performing the first command, and
   wherein the response is different from performing the second command.

6. The method of claim 1, further comprising transitioning, according to the transitioning hierarchy, between a first conflict-resolution setting and a second conflict-resolution setting of the plurality of available conflict-resolution settings.

7. The method of claim 1, wherein the response comprises the second command being performed after the first command is performed.

8. The method of claim 1, further comprising:
   detecting that the first user moved beyond a specified distance of the device; and
   performing the second command based on the detecting.

9. A system comprising:
   a processor; and
   a memory in communication with the processor, the memory containing program instructions that, when executed by the processor, are configured to cause the processor to perform a method, the method comprising:
   obtaining a conflict-resolution setting selected from a plurality of available conflict-resolution settings,
      wherein the conflict-resolution setting establishes one or more rules for resolving conflicting commands received by the processor, and
      wherein the plurality of available conflict-resolution settings has a preselected transitioning hierarchy;
   receiving a first command from a first user;
   receiving a second command from a second user,
      wherein the second command conflicts with the first command;
   determining, based at least in part on the conflict-resolution setting, a response to the second command; and
   performing the response via the processor.

10. The system of claim 9, wherein the response comprises the second command being performed after the first command is performed.

11. The system of claim 9, wherein the method performed by the processor further comprises:
    obtaining first-user data of the first user; and
    obtaining second-user data of the second user;
    wherein the determining is based at least in part on the first-user data and the second-user data.

12. The system of claim 11, wherein the determining further comprises comparing a seniority status of the first user to a seniority status of the second user.

13. The system of claim 11, wherein the determining further comprises combining the first command and the second command; and
    wherein the performing the response comprises performing a combination of the first command and the second command.

14. The system of claim 11, wherein the determining further comprises predicting the response based on the first-user data and the second-user data,
    wherein the response is different from performing the first command, and
    wherein the response is different from performing the second command.

15. A computer program product, the computer program product comprising a computer readable storage medium having program instructions embodied therewith, the program instructions executable by a computer to cause the computer to:
    obtain a conflict-resolution setting selected from a plurality of available conflict-resolution settings,
       wherein the conflict-resolution setting establishes one or more rules for resolving conflicting commands received by the computer, and wherein the plurality of available conflict-resolution settings has a preselected transitioning hierarchy;
receive a first command from a first user;
receive a second command from a second user;
　　wherein the second command conflicts with the first command,
determine, based at least in part on the conflict-resolution setting, a response to the second command; and
perform the response via the computer.

16. The computer program product of claim 15, wherein the instructions further cause the computer to:
　　obtain first-user data of the first user; and
　　obtain second-user data of the second user,
　　wherein the determining is based at least in part on the first-user data and the second-user data.

17. The computer program product of claim 16, wherein the determining further comprises comparing a seniority status of the first user to a seniority status of the second user.

18. The computer program product of claim 16, wherein the determining further comprises combining the first command and the second command; and
　　wherein the performing the response comprises performing a combination of the first command and the second command.

19. The computer program product of claim 16, wherein the determining further comprises predicting the response based on the first-user data and the second-user data,
　　wherein the response is different from performing the first command, and
　　wherein the response is different from performing the second command.

20. The computer program product of claim 15, wherein the response comprises the second command being performed after the first command is performed.

* * * * *